United States Patent [19]

Reba et al.

[11] 4,014,487
[45] Mar. 29, 1977

[54] WEB THREADING SYSTEM

[75] Inventors: Imants Reba, Vancouver, Wash.; Gerald Hugh Hogland, Estacada, Oreg.

[73] Assignee: Crown Zellerbach Corporation, San Francisco, Calif.

[22] Filed: Mar. 31, 1976

[21] Appl. No.: 672,172

[52] U.S. Cl. .................................. 226/5; 226/7; 226/91; 226/97; 226/110
[51] Int. Cl.² ................................. B65H 17/32
[58] Field of Search ............ 226/5, 7, 91, 97, 110

[56] References Cited

UNITED STATES PATENTS

| | | | |
|---|---|---|---|
| 3,650,043 | 3/1972 | Overly | 226/97 X |
| 3,705,676 | 12/1972 | Overly | 226/97 |
| 3,711,960 | 1/1973 | Overly | 226/97 X |

*Primary Examiner*—Richard A. Schacher
*Attorney, Agent, or Firm*—Thomas R. Lampe

[57] ABSTRACT

An improved system for directing a web of flexible material to a predetermined location, and more particularly, a system for directing the end or tail of a moving web into threading engagement with rolls forming a nip or the like. In this system a gas such as air is directed through a restricted opening under pressure whereupon it attaches itself to a flow attachment surface due to the "Coanda effect", so that it entrains ambient air and the moving web tail. In a preferred form of the system, after the web tail has been entrained and conveyed a predetermined distance, a substantial portion of the combined flow of the entraining gas and the entrained ambient air are diverted off toward a different direction. At the location of diversion, restraining means is provided for preventing the web tail from moving with such substantial portion of combined flow. Another aspect of the invention resides in orientation of the restricted opening and flow attachment surface so that the web entrained thereby defines a concave path. Still another aspect resides in utilizing two Coanda nozzles in the system, the first of which is positioned to throw the web to the second across an open space of sufficient magnitude to dissipate a substantial portion of the gaseous flow from said first nozzle so that it does not interfere with operation of the second nozzle.

19 Claims, 11 Drawing Figures

PRIOR ART

WEB THREADING SYSTEM

BACKGROUND OF THE INVENTION

In the manufacture of paper, plastic film or the like, web breakage occasionally occurs. Web breakage presents the operator with the difficult problem of rethreading the web, especially when the break occurs on continuously running machines, such as papermaking machines, since it is not desirable to shut down the machines completely due to attendant startup difficulties, etc. As a consequence, it is a commonly used technique for the machine operator and his assistants to attempt to manually grasp the web on the fly while the machine continues to operate and direct it into close proximity with the next station, such as a roll nip. It will be appreciated that this is a difficult and dangerous procedure and it is possible for a person attempting to thread the machine in such a manner to become injured, even to the extent of losing fingers or hands. Also, the standard procedure is often quite time-consuming with numerous attempts to thread the web tail often being necessary before success is attained. Until rethread is successfully accomplished, production is lost. Similar problems also occur of course when an end or tail of an unbroken web is threaded initially.

In copending U.S. application Ser. No. 581,306, filed May 27, 1975, a system of relatively inexpensive and simple construction is disclosed which utilizes a phenomenon known as the "Coanda effect" to entrain the end or tail of a moving web of flexible material and direct it to a desired location such as a nip formed between two rotating rolls. The Coanda effect itself has been known for many years, as exemplified by U.S. Pat. No. 2,052,869, issued to Henri Coanda. Briefly, this phenomenon can be described as the tendency of a sheet of fluid, which has been formed, for example, by passing through a slit or similar restricted opening under pressure, to attach itself or cling to and follow a generally curved surface. This creates a zone of reduced pressure in the area of the slit so that relatively large quantities of ambient air or other entrainable material which are in the zone will become entrained and flow with the fluid which has attached itself to the extended lip.

More particularly, apparatus constructed according to the invention of the aforesaid application Ser. No. 581,306 is disposed adjacent to the normal path of movement of a web of flexible material and in proximity with the nip or other desired predetermined location to which the tail of the web is to be directed. The apparatus includes at least one wall element open to the atmosphere along at least a major portion of its length. A restricted opening, preferably in the form of a slit, is formed in the wall element and the restricted opening is in selective communication with a source of pressurized gas such as air. A generally curved flow attachment surface recedes from the restricted opening and leads toward an end of the wall element. The device is actuated by causing passage of the gas under a high velocity from the source of gas through the slit or other suitable restricted opening. Due to the Coanda effect, the gas passing through the restricted opening attaches to the flow attachment surface and is directed in the form of a high velocity gaseous sheet along the wall element toward the end thereof. The high velocity gaseous sheet causes entrainment of ambient air along the wall element. The tail of the web which is to be directed to the predetermined location is directed into the combined gaseous flow along the wall element. Because the velocity of gaseous flow is substantially greater than the speed of the moving web itself, the web tends to straighten out in the direction of the predetermined location and the web is aimed at the location with little or no manual assistance. When the tail enters the nip it is pulled tight and automatically lifts itself from the apparatus into its normal path of movement.

The apparatus according to the above-described invention may take a number of forms. For example, the apparatus may be mounted in a more or less permanent fashion or it may be mobile or even take the form of a handheld operator-manipulated device. Further, the above-described apparatus of application Ser. No. 581,306 may be provided with a plurality of combinations of restricted openings and flow attachment surfaces, i.e. Coanda nozzles.

While the afore-described system disclosed in U.S. patent application Ser. No. 581,306 has operated in an essentially satisfactory manner, some difficulties in operation have been encountered under certain conditions. In particular, under certain conditions the combined flow of entraining gas and entrained air used to transport the web tail can actually interfere with the proper operation of the system. For example, in those tail threading systems employing a plurality of Coanda nozzles sequentially along the tail path, as exemplified by several embodiments illustrated in the aforesaid application Ser. No. 581,306, the combined gaseous flow from the first Coanda nozzle can cause flow interference at the Coanda nozzle positioned upstream therefrom. In an arrangement of the type shown in FIGS. 11–13 of application Ser. No. 581,306 wherein change of web direction is effected at the second Coanda nozzle, this problem becomes particularly acute and the flow from the first Coanda nozzle may carry the web tail too high above the second Coanda nozzle for it to be effective, with the tail having a tendency to float or be thrown off the device unless appropriate flow adjustments are made. The conventional approach to minimizing flow interference is to reduce the pressure and flow rate of the gas exiting from the first Coanda nozzle (used for web pickup) to less than that utilized at the next Coanda nozzle deployed upstream. Often this is undesirable, since more energy is normally required during the web pickup phase of the operation at the initial Coanda nozzle location, where the tail direction is drastically changed and the device often has to handle what is essentially a two-ply tail until the threading is accomplished, than at the second and subsequent Coanda nozzles which are normally used to effect conveyance and actual threading of the web tail. Another approach to elimination of flow interference is to shut off the pressurized air supply at the first Coanda nozzle as soon as the web end or tail reaches the second nozzle. This approach, however, is not usually feasible due to the high speeds at which the tail is conveyed by the system.

Excessive gaseous flow can also cause difficulties even in those arrangements employing a single Coanda nozzle which is utilized to direct a web tail into a roll nip or the like. If the end of the web threading unit is placed into too close a proximity with the nip a "backflow" problem may result when the excess gaseous flow hits the surfaces of the rollers forming the nip. This can result in the web tail being forced out of the nip by the air flow prior to its being threaded.

The afore-mentioned problems are solved in accordance with the teachings of the present invention by providing a wall element having a web transfer surface open to the atmosphere and having a web entry and a web exit end and employing in combination therewith separator means disposed at the wall element exit end for separating the web from a substantial portion of the combined flow of the entraining gas and entrained ambient air so that excess gaseous flow is not a problem when the web tail reaches its desired downstream directive which may be either a restricted opening-flow attachment surface combination or the ultimate objective which is a threading nip formed by two rollers or the like. Separation of a substantial portion of the gaseous flow and the web is accomplished by providing a diverting wall element connected to the wall element having a web transfer surface and web restraining means for preventing the web from moving along the diverting wall element with a substantial portion of combined gaseous flow diverted therealong. The web restraining means comprises a barrier fixedly positioned at the wall element exit end adapted to be engaged by the web. The barrier has openings therein through which the substantial portion of the combined flow of entraining gas and entrained ambient air may pass freely. The diverting wall element has a generally curved Coanda fluid flow diverting surface for changing the direction of movement of the substantial portion of the combined flow of the entraining gas and the entrained ambient air. The apparatus according to the present invention may take a number of forms. For example, the apparatus may be mounted in a more or less permanent fashion or it may be mobile or even take the form of a handheld operator-manipulated device.

Another aspect of the invention resides in the utilization of a foil element which defines the generally curved fluid flow attachment surface that is angularly positioned relative to the web transfer surface so that the entraining gas impinges against the web transfer surface and the entraining gas traverses a concave path of movement. This feature is utilized when appropriate to place the web path in the vicinity of the slit where maximum suction forces are imparted to the web tail by the gas exiting from the restricted opening and flowing around the foil flow attachment surface. Yet another aspect of the invention resides in the employment of auxiliary nozzle means to blow a web tail off a rotatable dryer can or the like and assist in placement of the web tail into close proximity to the foil. Still another aspect of the invention resides in employing a pair of spaced units in the system, each unit having at least one Coanda nozzle and associated wall element, with the first unit being positioned so as to direct or "pitch" the web end or tail to the second unit which "catches" it and redirects movement of the tail. The units are spaced a substantial distance apart so that the flow of entraining gas associated with the web is substantially dissipated.

BRIEF DESCRIPTION OF THE DRAWINGS

Embodiments of the present invention are illustrated in the accompanying drawings in which.

GENERAL DESCRIPTION

Figure 1:
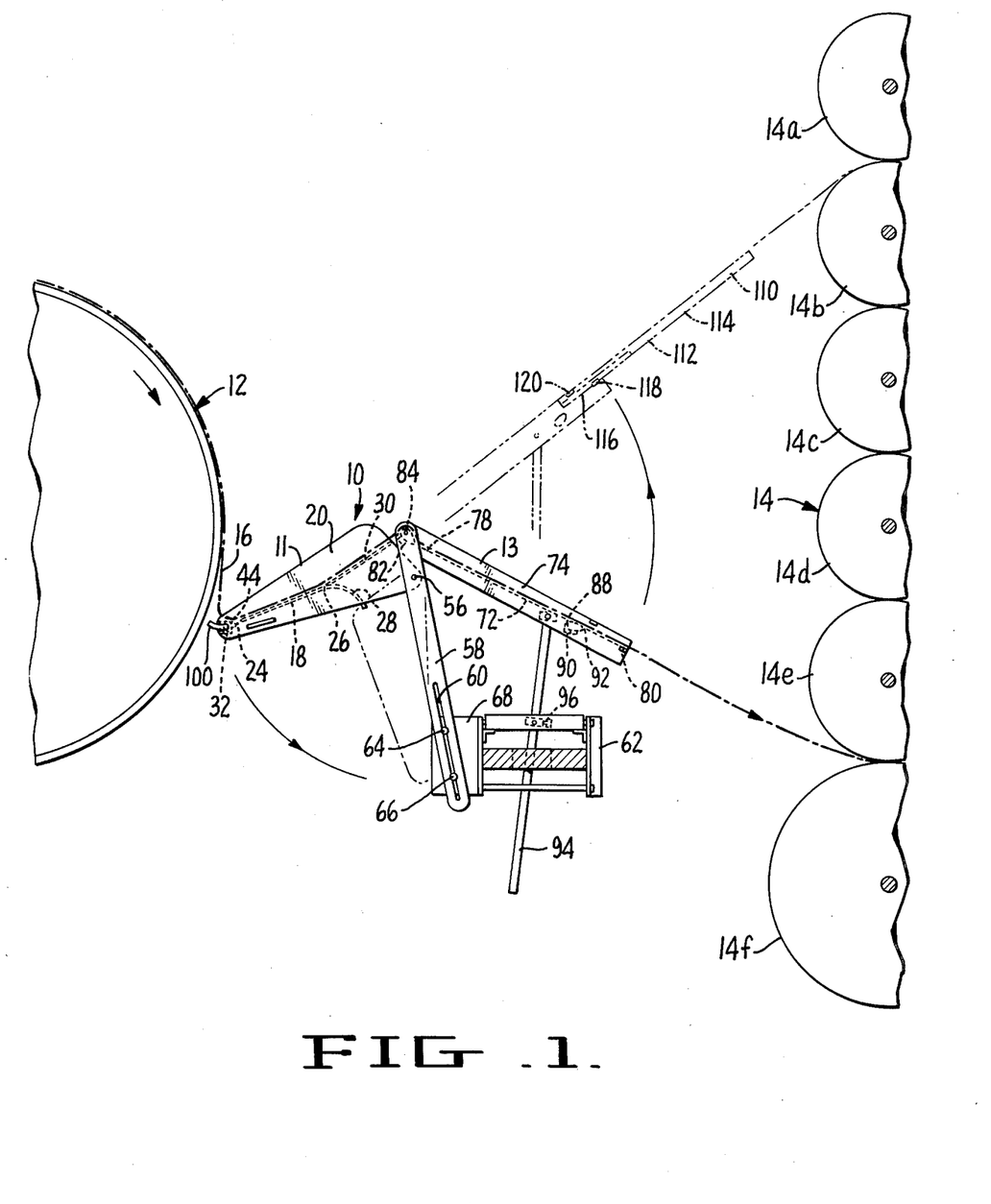
FIG. 1 is a schematic side view in partial cross-section illustrating apparatus constructed according to the present invention disposed between a dryer can and a calendar stack.
Figure 2:
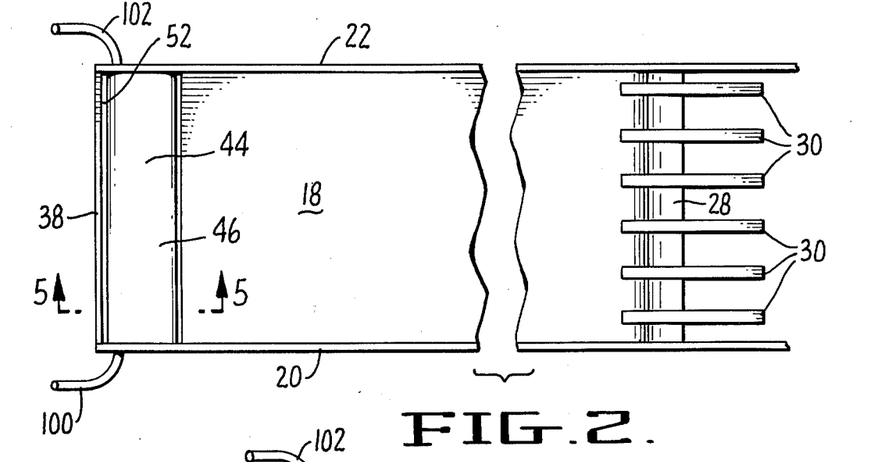
FIG. 2 is an enlarged plan view showing operational details of the means employed to create a high velocity gaseous flow at the web entry end of the apparatus of FIG. 1.
Figure 5:
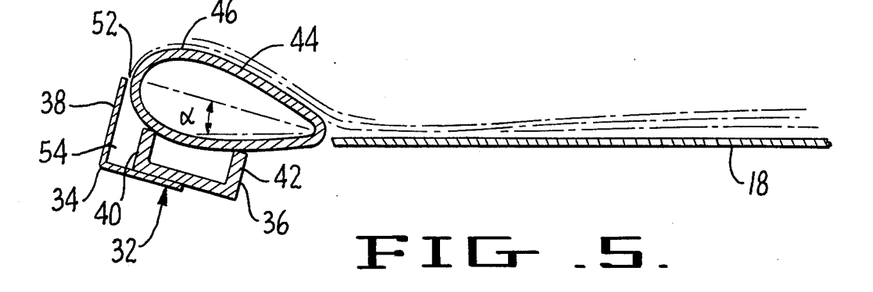
FIG. 5 is a cross-sectional view taken in the direction of line 5—5 of FIG. 2 and illustrating a convex gaseous flow path defined by the foil element of the means employed to create a high velocity gaseous flow and the web transfer surface cooperating therewith.

Referring now to FIGS. 1, 2 and 5, one form of apparatus incorporating the teachings of the present invention is illustrated. The apparatus is generally designated by reference numeral 10 and for purposes of illustration is shown as being disposed between a rotating dryer can 12 and a calender stack 14 of a conventional papermaking machine. It will be appreciated, however, that the apparatus and method of the present invention may be effectively utilized in any operating environment wherein it is desirable to direct a moving web of flexible material to a desired location, as for example during a rethreading or initial threading operation. In the illustrated operating environment calender stack 14 comprises a plurality of calender rolls 14a–14f defining a plurality of calender nips in a well-known manner. The distance between the operating components of papermaking and similar machines varies. However, it is not uncommon for such distances to approach or even exceed 20 feet or more.

In the process of making or converting paper or other webs of flexible material web breaks occasionally occur. It will be appreciated that if one wishes to keep the machine or machines through which the web passes in continuous operation, it is a somewhat difficult task to rethread the moving web, especially when the web is moving at a relatively high velocity or if the break has occurred in a section of the operation in which a long distance exists between the operating elements between which the web normally passes. For example, it is not unusual for newer design papermaking machines to run at speeds up to 4,000 feet per minute or more.

When a break occurs in a papermaking machine, for example between the dryer can 12 and calender stack 14 of the illustrated portion of a papermaking machine, the web is usually directed by the machine operator into a broke pit (not shown) which is conventionally formed below and adjacent to dryer can 12 as well as the other components of the machine. The utilization of a broke pit is conventional in papermaking and similar machines. The portion of the web passing into the broke pit is normally later recovered for recycling through the process. In the arrangement of FIG. 1 the dryer can 12 continuously moves in the clockwise direction indicated by the arrow with the web 16 being disposed on the outer movable web-carrying surface thereof in the well-known manner. The web 16 of course normally passes directly from the external surface of the dryer can into engagement with one of the nips of the calender stack 14. Upon breakage of the web for any reason, or when threading of a new web is initiated, apparatus 10 is employed in the position illustrated between dryer can 12 and calender stack 14 to re-establish web communication therebetween.

As stated above, redirecting web 16 into one of the preselected nips formed by calender stack 14 can be a difficult and unsafe procedure and the present invention has as one of its objects obviating such difficulties. Although operation of the present invention is described with respect to a web breakage situation it will be appreciated that the invention may be employed in any working environment where it is desired to direct the end of a web to a desired location.

Apparatus 10 includes a first or upstream segment 11 comprising a channel member including a bottom wall element 18 and two side walls connected thereto. The bottom wall element has an upper web transfer surface and the bottom wall element and side walls define a channel member interior open to the atmosphere at the top thereof and having a web entry end 24 and a web exit end 26. In the particular apparatus embodiment illustrated, the bottom wall element 18 is substantially straight.

At the web exit end 26 bottom wall element 18 is integrally connected to a diverting wall element 28 having an upper generally curved fluid flow diverting surface. At the point of intersection between bottom wall element 18 and diverting wall element 28 a plurality of bar members or rods 30 are end-mounted so that they project in spaced relationship from the web transfer surface of the wall element 18 with the rods spaced from one another. The functions of the bar members 30 and the diverting wall element 28 will be described later.

Disposed at the web entry end of wall element 18 is means in the form of a two-dimensional Coanda nozzle for introducing a thin sheet of high velocity gas into the interior of the channel member and directing the gas along the upper web transfer surface of the wall element 18. As may thus be seen with reference to FIG. 5, the two-dimensional Coanda nozzle includes a bracket 32 which may be formed of rolled steel, extruded aluminum, or the like, which extends between and is secured to side walls 20 and 22 in substantially airtight fashion. Bracket 32 includes an L-shaped bracket member 34 and a U-shaped bracket member 36 welded or otherwise secured thereto to provide three upstanding legs 38, 40 and 42. Welded or otherwise secured to the uppermost extent of legs 40 and 42 is an elliptically-shaped foil element 44 having an upper generally or substantially smoothly curved flow attachment surface 46 and major and minor elliptical axes. The foil element 44 may also be formed of rolled steel, extruded aluminum or the like. While any suitable two-dimensional Coanda nozzle may be utilized to practice the teachings of the present invention, the illustrated form is preferred because it may be readily constructed from "off-the-shelf" steel or aluminum, etc., channel and foil-shaped elliptical tubing components that may be cut to length and assembled. Fluid flow attachment surface 46 recedes from a restricted opening formed between the leading edge of the foil element 44 and the uppermost extent of upstanding leg 38, said restricted opening being in the form of an elongated slit 52 extending across the full extent of the channel member interior as shown most clearly in FIG. 2. The width of the slit preferably is within the range of from about 0.005 in. to about 0.02 in. The radii of curvature of the foil element gradually increase from the leading edge to the trailing edge thereof. A leading edge radius of 0.5 in. has been found to be satisfactory.

Bracket members 34 and 36 and foil element 44 define an interior 54 which is in fluid flow communication with a suitable source (not shown) of pressurized gas such as air by virtue of a conduit or the like (also not shown). It will be appreciated that communication with the source of pressurized gas is selective at the will of the operator through a suitable and conventional valve arrangement (also not shown). Thus, assuming that pressurized gas passes through a supply line into interior 54, it will exit through slit 52 in the form of a high speed sheet of moving gas extending across the full width of the bottom wall element 18. To practice the present invention it is necessary that the velocity of gas exiting through slit 52 be greater than the velocity of web 16 as it exits from dryer can 12. For the preferred slit width range noted above the gas pressure should fall within the range of from about 5 to about 90 psig. The required pressure varies with the paper machine speed and basis weight and other characteristics of the paper.

Due to the Coanda effect, which can be briefly described as the tendency of a sheet of fluid, which has been formed, for example, by passing through a restricted orifice such as a slit under pressure, to attach itself or cling to and follow a generally curved surface, the high speed stream of gas which passes through slit 52 attaches itself to the flow attachment surface 46 of the foil element 44 and is directed therealong so that the stream of moving gas moves along bottom wall element 18 from the web entry end 24 thereof to web exit end 26. Movement of the high speed gas causes entrainment of ambient air within the area defined by bottom wall element 18 and side walls 20 and 22. The high velocity gas and the entrained air result in a combined flow of the entraining gas and the entrained ambient air along the web transfer surface of bottom wall element 18 at a speed greater than the speed of the moving web 16. The velocity of the entraining gas can of course be regulated by varying the degree of pressurization of the gas as it exits through slit 52. In addition, an arrangement similar to that disclosed in aforementioned U.S. application Ser. No. 581,306, filed May 27, 1975, may be employed to vary the size of the slit, as by means of a plurality of adjustment screws cooperating with leg 38.

An important feature of the present invention resides in the previously described diverting wall element 28 combined with the feature of the bar members 30. These elements together cooperate as separator means disposed at the end of the bottom wall element 18 web exit end for separating a web tail that has been entrained by the combined flow of the entraining gas and the entrained ambient air from a substantial portion of the combined flow. The substantial portion of the combined flow of the entraining gas and the entrained ambient air is diverted downwardly after it passes through the upstanding bar members 30 since the top surface of the diverting wall element is a generally curved surface which will bring the Coanda effect into play and cause attachment of a substantial portion of the combined flow to attach thereto and be diverted in a downward direction. In other words, a substantial portion of the combined gaseous flow is vented from the system. The web tail on the other hand is prevented from moving downwardly with the substantial portion of combined gaseous flow by means of the bar members 30 which function to restrict the web from movement along with the substantial portion. The web tail, however, will continue to move because of its inertia and because of the existence of the remainder of the gaseous flow that has not been diverted downwardly.

Pivotally connected to the end of side wall 20 by means of a pivot pin 56 or the like is a support arm 58 which has a longitudinal slot 60 formed at the lower extent thereof. The purpose of support arm 58 is to support the elements of apparatus 10 at a preselected position relative to dryer can 12 and calender stack 14. In the embodiment shown in FIG. 1 the lowermost extent of support arm 58 is connected to a walkway 62 of the type conventionally installed between the components of a papermaking machine. Of course, the apparatus constructed in accordance with the teachings of the present invention may be supported in any desired manner with any suitable support structure depending upon the exigencies of the operating conditions found. Adjustment of the support arm 58 is accomplished by means of adjustment bolts 64 and 66 which pass through slot 60 and through suitable holes formed in a mounting plate 68 attached to walkway 62.

At the upper end thereof support arm 58 is pivotally connected to a second or downstream segment 13 of apparatus 10. This downstream segment comprises a second bottom wall element 72 disposed between two side walls, only one of which, side wall 74 is shown. Second bottom wall element 72 has an upper second web transfer surface and a web entry end 78 and a web exit end 80. Disposed at web entry end 78 is a second two-dimensional Coanda nozzle including a bracket 82 and a foil element 84. The second Coanda nozzle is not shown in detail since it is preferably of the same construction as that of the first two-dimensional Coanda nozzle described above disposed at the extreme left end of apparatus 10. Again, the bracket and foil element define a restricted opening in the form of an elongated slit and the foil element 84 has a generally curved fluid flow attachment surface directed toward the second web transfer surface of second bottom wall element 72. It will be seen that the bar members 30 are positioned such that they are directed toward foil element 84. Thus, the web tail after exiting from the free ends of bar members 30 will be placed into close proximity to the foil element 84. Therefore, assuming that a pressurized gas is passing through the restricted opening formed by bracket 82 and foil element 84, the web tail will be entrained by the entraining gas which passes around the upper flow attachment surface of foil element 84. Since second bottom wall element 72 and the side wall associated therewith define an open passageway, ambient air will again be entrained and the combined gaseous flow of entraining gas and entrained ambient air will flow along with the web tail along the web transfer surface of second bottom wall element 72.

In the arrangement illustrated, a gap 88 is formed in second bottom wall element 72 wherein a third bracket-foil element combination 92 is positioned. Again, this third Coanda nozzle is preferably of the same construction as those two previously described. It will be appreciated that the number of Coanda nozzles employed in any given apparatus will depend upon the length of traversal of the web tail as well as the path configuration that must be traversed by the tail. Toward the downstream end of the downstream segment of apparatus 10 a support rod 94 is pivotally mounted through any suitable bracket means. The support rod 94 may be used to angularly adjust the downstream segment of apparatus 10 about the pivot point interconnecting the downstream segment and support arm 58. Any suitable locking mechanism 96 may be used to fixedly position support rod 94 relative to walkway 62 as desired. In the position illustrated in FIG. 1 the downstream segment of apparatus 10 is "aimed" toward the nip formed between rollers 14e and 14f. It will be appreciated, however, that adjustment of the support rod 94 can result in aiming of the system into any of the nips of the calender stack 14, as desired.

Operation of apparatus 10 will now be described. Assuming that a break has occurred in web 16, the end or tail of the web exiting from dryer can 12 falls downwardly into a conventional broke pit (not shown). It may be necessary for the operator to manually direct the tail into the broke pit; however, once movement into the pit has been established, it will continue. The width of the illustrated form of apparatus 10 is quite narrow, for example, about 2 in. to about 24 in. wide, as compared to the width of the web passing through a conventional papermaking machine. While the principles of the present invention could be applied to apparatus to thread a web end or tail of full web width, it will be appreciated that construction costs go up and operational flexibility normally decreases when such as the case. To produce a web width that can be accommodated by relatively narrow apparatus 10, the machine operator narrows the effective width of the web in a conventional manner, such as by use of a water jet at the wet end and/or a paper knife at the dry end so that the web tail passing into the broke pit assumes a width less than the width of bottom wall elements 18 and 72, which by the way are normally of the same width. When it is desired to reestablish communication between dryer can 12 and calender stack 14, the apparatus 10 according to the present invention is actuated by introducing pressurized gas through the gas supply line associated with foil element 44; substantially simultaneously, pressurized gas is also introduced into the Coanda nozzles incorporating foil elements 84 and 92. The gas passing through the restricted opening formed between bracket 32 and foil element 44 results in a continuously moving stream of air throughout the entire interior of the first or upstream segment 11. The combined gaseous flow is of course comprised of the entraining gas exiting from elongated slit 52 and air entrained thereby. As the gaseous flow reaches the web exit end 26 of the first or upstream segment 11 a substantial portion thereof is directed downwardly along diverting wall element 28 since wall element 28 defines a generally curved surface which brings the Coanda effect into play. In the meantime, of course, a flow of air also takes place within the interior of second or downstream segment 13 due to the actions of the two Coanda nozzles 82, 84 and 90, 92. It will be noted that the second or downstream segment 13 does not incorporate a terminal diverting wall element similar to the wall element 28 found in the first or upstream segment. In this particular arrangement there is no need for such a terminal diverting wall element since the end of apparatus 10 is sufficiently far away from the calender stack to avoid extreme blow-back of the gaseous flow as it hits the calender stack that would interfere with the functioning of the apparatus 10. In relatively close quarters, however, a device constructed in accordance with the teachings of this invention could incorporate such a diverting surface as needed.

After fluid flow has been initiated, the end or tail of the web 16 and the first Coanda nozzle 32, 44 are brought into proximity to assist in the removal of the newly formed tail from the peripheral surface of the dryer can 12. This is accomplished by the operator pivoting first segment 11 about its pivot pin 56 to move the first segment from the position it normally occupies under the influence of gravity (shown in phantom in FIG. 1) to the working position (solid line position of FIG. 1). Apparatus 10 may incorporate auxiliary web removal jets 100, 102 disposed on either side of the first Coanda nozzle, communicating with interior 54 thereof and directed upwardly against the surface of the dryer can. This latter feature is desirable when the present system is used in association with a dryer can or other element having a web support surface since sticking of the web to the surface may occur.

After the end or tail of the web 16 and the foil element 44 are in close proximity the gas being emitted from elongated slit 52 and which passes along the foil surface entrains same and directs it along bottom wall element 18. Obviously, of course, the velocity of the combined flow of the entraining gas and the ambient air must exceed the velocity of the web for the tail thereof to be transported along the segment 11. Initially, until the tail is torn by the operator to leave the excess in the broke pit, the tail passing through the system will be effectively two-ply. As previously stated, a substantial portion of the combined gaseous flow exits along diverting wall element 28 while the web tail is propelled along bar members 30 by virtue of its own inertia and that portion of the gaseous flow which has not been vented downwardly. Continued movement of the web tail brings it into close proximity to the second Coanda nozzle of the system, that is, the nozzle formed by bracket 82 and foil element 84. The carrier rods of course are aimed at the second Coanda nozzle. After the web tail has been caught by the second nozzle and becomes entrained by the pressurized gas exiting therefrom, the operator can lower first segment 11 by allowing same to pivot about pivot pin 56 since this segment is no longer necessary to the proper operation of the unit in the continued conveyance of the web tail to its desired objective.

It is important to note with respect to the above-described phase of the operation of apparatus 10 that the venting of a substantial portion of the gaseous flow will prevent undue flow interference from the first nozzle that would interfere with the proper operation of the second nozzle. If some of the flow were not vented along the diverting wall element 28, it is possible that the web tail could be positioned too high above the second nozzle for it to be caught thereby. The tail would then have a tendency to float or be thrown off the apparatus 10. This is particularly apt to happen where a downward change of web direction is to take place at the location of the second nozzle. The present arrangement enables a highly pressurized gas to be employed at the first nozzle location without fear of interrupting the proper operation of the rest of the device. Of course, generally speaking, the higher the pressurization of the gas, the greater its capacity for web pickup. For the reasons previously stated, more energy is normally required during the web pickup phase of the operation of the first nozzle than during the other phases of operation of the apparatus 10.

The combined flow of entraining gas exiting from Coanda nozzle 82, 84 and entrained ambient air proceeds along second bottom wall element 72 of the second or downstream segment 13 of apparatus 10. The web tail is also entrained therealong assuming of course that the velocity of the combined gaseous flow exceeds the velocity of the web. The web tail continues moving until it hits the third and final Coanda nozzle 90, 92. This final nozzle in effect rejuvenates the gaseous flow and causes the web tail to exit from the end of apparatus 10 and be projected to the desired location, in this case the nip formed between calender rolls 14e and 14f. It will be appreciated that apparatus 10 may be "aimed" at any desired nip of the calender stack through adjustment of support arm 58 and support rod 94 which of course may be locked in any suitable position by virtue of the previously described locking elements associated therewith. It will be appreciated that when the tail enters the desired nip, it is pulled tight between the calender stack and the dryer can and is lifted out of engagement with apparatus 10. After the web enters the nip of calender stack 14 the operator widens the width to its full width in the well-known manner. It will thus be seen that with the present invention the operator need not come into close proximity with the nips of calender stack 14 in order to thread same.

It is obvious that as the second apparatus segment 13 is "aimed" toward the upper nips of calender stack 14 the end of the segment is positioned further and further away from the location where it is desired to direct the tail of the web. For this reason, apparatus 10 preferably incorporates means whereby the effective length thereof may be increased through the addition of one or more extension sections. A suitable extension section 110 is shown in phantom in FIG. 1 when apparatus 10 is "aimed" at the topmost nip formed between calender rolls 14a and 14b. Extension segment 110 includes a flat bottom wall 112 and, in the embodiment illustrated, two upstanding parallel side walls connected thereto, only one of these side walls 114 being shown. Attachment bars in the shape of elongated rods with circular cross-section are attached to the side walls of the extension segment as by welding with a significant portion of the bars extending beyond the ends of the extension segment bottom wall and side walls. Only one attachment bar, bar 116, is shown. The attachment bars are adapted to overlie the side walls of second segment 13 and be held by braces 118 and 120, a pair of which are attached to each of the side walls of the second segment as by welding. Each of the braces has a semi-circular configuration. Braces 120 restrain their associated attachment bars from upward movement while braces 118 restrain their associated bars against downward movement as the extension segment 110 is continuously urged downwardly by the force of gravity. It will be readily appreciated that this arrangement enables the extension segment to be readily removed from the rest of the apparatus 10 when not needed. When the extension segment 110 is attached to the rest of apparatus 10 through the interaction of the braces and attachment bars bottom wall 112 thereof is maintained in substantial alignment with the bottom wall element of second segment 13 whereby a smooth flow of air therealong is maintained. Although extension segment side walls are preferred, they may not be necessary in all cases. Also, of course, various means may be employed to connect the extension segment to the rest of the apparatus.

Figure 3:
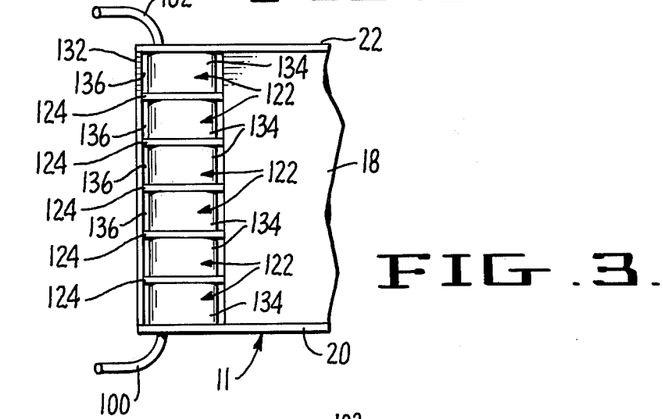
FIGS. 3 and 4 are views similar to that of FIG. 2 but illustrating operational details of alternative means employed to create a high velocity gaseous flow.
Figure 4:
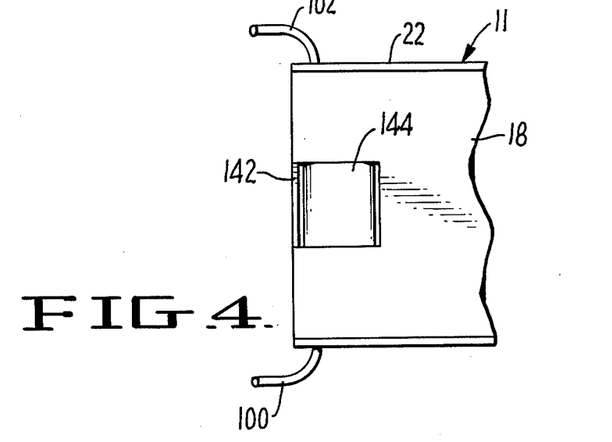

FIGS. 3 and 4 illustrate alternative forms of Coanda nozzles that may be employed in apparatus 10. These figures illustrate such nozzle variations in association with the web entry end of bottom wall element 18 of first apparatus segment 1. FIG. 3 is illustrative of the fact that the means employed to create a high velocity gaseous flow within the system need not comprise a single nozzle extending across the full width of bottom wall element 18 but rather may comprise a plurality of separate nozzle segments 122 extending across the width of apparatus 10 with the nozzle segments 122 being separated by means of separator plates 124. Each of the nozzle segments may, if desired, be activated or shut off separately through suitable valve arrangements associated with each nozzle segment. Thus, the flow profile across the bottom wall element 18 may be adjusted to suit conditions. Each nozzle segment, of course, comprises its own bracket segment 132 and foil element segment 134 so that the entraining gas is introduced into the system through a plurality of slits 136 disposed in substantial alignment.

FIG. 4 illustrates an arangement wherein a single Coanda nozzle comprising a bracket 142 and a foil element 144 does not extend across the full width of bottom wall element 18. An arrangement of this type is desirable wherein the apparatus 10 is used to convey relatively lightweight or weak webs. It will be appreciated that an arrangement of the type shown in FIG. 4 will entrain less ambient air and thus result in less combined gaseous flow than the arrangements previously described, assuming of course that operational factors such as slit width, degree of pressurization, etc. are the same. The arrangements of FIGS. 3 and 4 are obviously less likely to result in flooding of the system with excess gaseous flow than is the arrangement of FIG. 1. Excessive flooding can cause the web tail to jump out of the system altogether, twist or break.

It has been found that nozzle orientation within apparatus constructed in accordance with the present invention greatly affects web holding and conveying capabilities. Different orientations of the nozzle with respect to its associated bottom wall element will result in different working characteristics and nozzle orientation should be chosen to fit the required web path. For a proper understanding of this concept the principles of nozzle flow first will be reviewed briefly.

Figure 7:
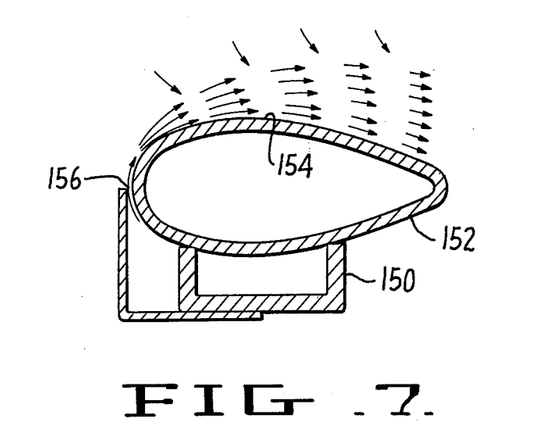
FIGS. 7 and 8 are schematic views of foil nozzles of the type employed in the present invention illustrating respectively a typical velocity history and typical pressure distribution during operation thereof.

FIG. 7 illustrates in schematic fashion a two-dimensional nozzle utilized in practicing the present invention which includes a bracket 150 and a foil element 152 having a generally curved flow attachment surface 154. FIG. 7 depicts a typical velocity history downstream from the slit 156 formed between the bracket and the foil element. Two fundamental features of the velocity history should be noted. First, the magnitude of the velocity vector decreases as the flow progresses along the fluid flow attachment surface 154. Second, flow deceleration is caused mainly by the entrainment and mixing resulting in a rapid growth of jet thickness. Thus, the jet boundary recedes from the nozzle surface.

Figure 6:
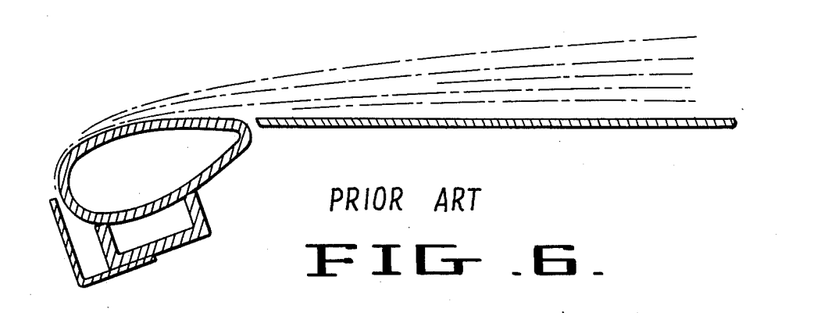
FIG. 6 is a view similar to that of FIG. 5 but illustrating conventional prior art orientation between a foil element and a web transfer surface.
Figure 8:
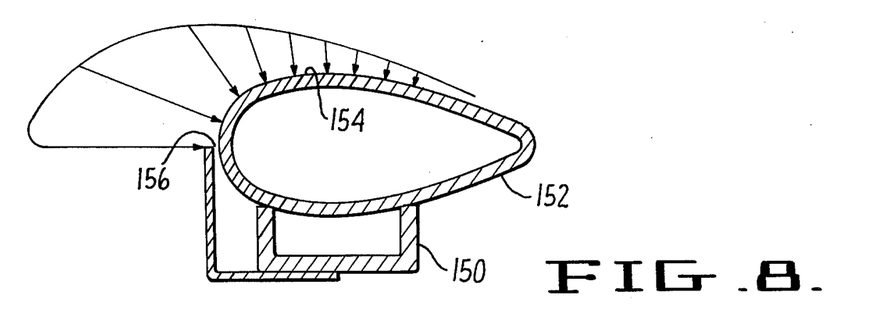
Figure 9:
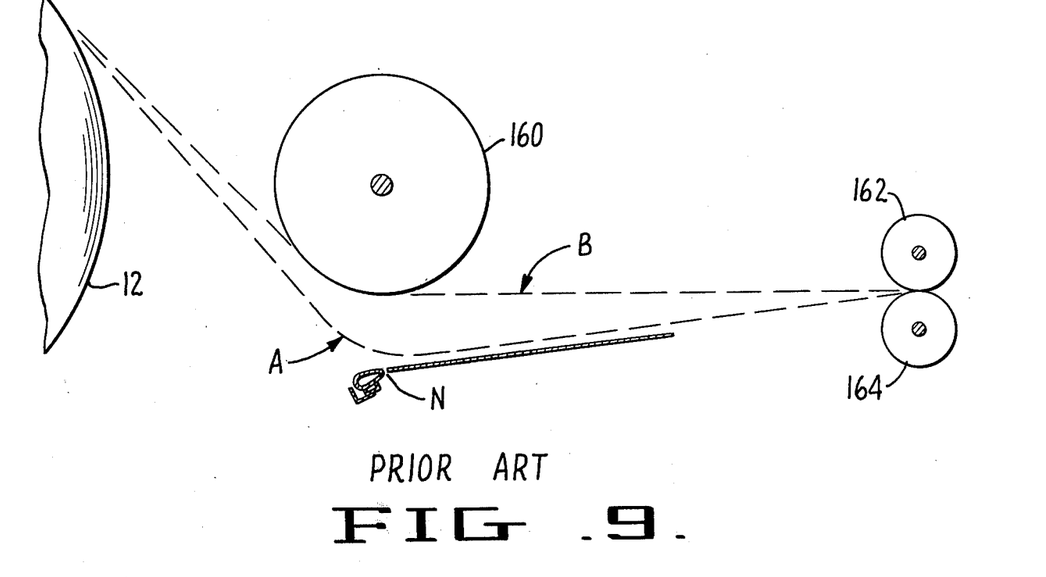
FIG. 9 is a schematic side view illustrating a typical work situation wherein a web tail end is to be conveyed from one location to another and illustrating the use of a nozzle configuration of the type illustrated in FIG. 6.

FIG. 8 shows the resulting nozzle surface pressure distribution. As indicated by the arrows, the pressure gradient acts towards the flow attachment surface 154 creating thereupon suction or holding forces. The maximum force is nearest to the slit 156 when the jet velocity is maximum and the radius of surface curvature is minimum. This force continuously decreases because of increased radius of curvature and momentum loss due to friction and mixing. Lengthening of the flow path by a convexly curved surface extension produces continuously spreading and decelerating flow as depicted in FIG. 6. If the web path is essentially congruent with the curvature of the nozzle and its associated bottom wall element, the web will feel the strong holding and propulsive forces existing in the vicinity of the leading edge. Further downstream, particularly along the nozzle extension where suction forces are low, the web will travel in the vicinity of the interface formed between the jet of entraining gas and ambient air. Thus, it will tend to lift off from the surface. To keep the web from spilling, side plates with progressively increasing height are normally required. A configuration of the type illustrated in FIG. 6, that is a configuration wherein the major axis of a two-dimensional Coanda nozzle forms a convex flow path for the web with its associated bottom wall element, is suitable for certain, but not all, operating environments. For example, FIG. 9 illustrates a situation wherein a tail is to be conveyed from a dryer can 12 under a spreader roll 160 and into a calender nip formed between two calender rolls 162 and 164. The path a web would traverse during the threading operation is designated by the arrow A while the arrow B designates the path that would be assumed by the web after the web is caught in the calender nip. In this example, the web forms a concave path during the threading operation. If one were to install a Coanda nozzle N as shown in FIG. 9 in the conventional manner with the main axis of the foil element angled downwardly from its associated bottom wall element, the leading edge of the nozzle would be oriented away from the web. Thus, the web path would not be essentially congruent with the curvature of the foil element and its associated bottom wall element and the web would not have applied thereto the maximum suction or holding forces which the nozzle can produce. Consequently, sufficient downstream perturbations as exemplified by a slight catching at the nip may cause the tail to lift off and lose its speed and driving force.

Figure 10:
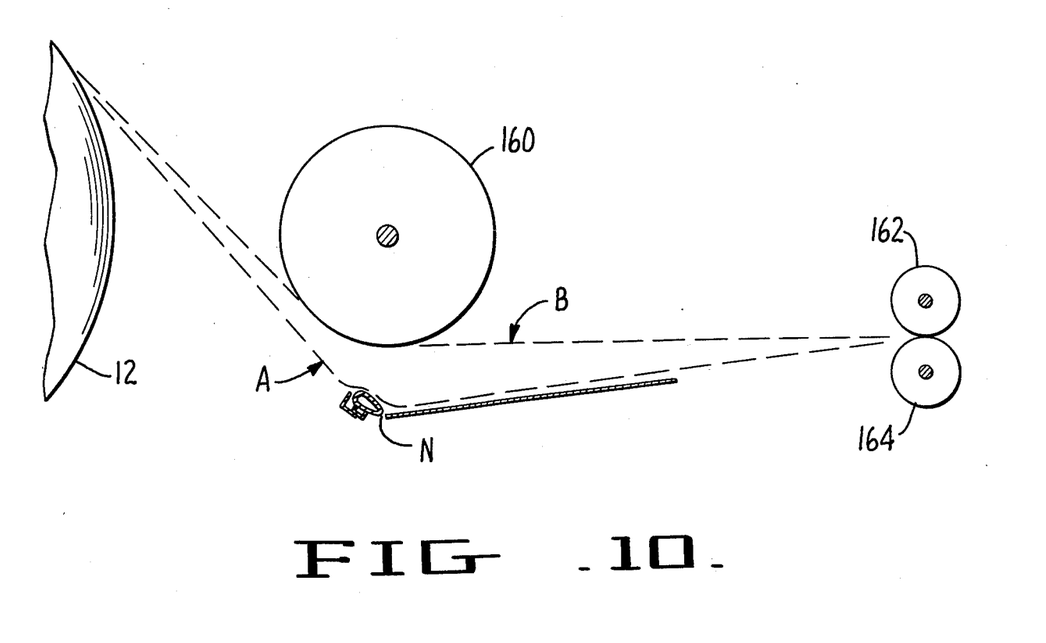
FIG. 10 is a view similar to that of FIG. 9 but illustrating the use of a nozzle of the type shown in FIG. 5.

The aforesaid problem can be solved by the use of a nozzle mounted in the manner illustrated in FIG. 10 wherein the main axis of the foil element is angled upwardly from its associated bottom wall element and defines a concave web path therewith. In this arrangement the web threading path A is essentially congruent with the curvature of the foil element and the web supporting surface of the bottom wall element associated with the nozzle, exposing the web to the maximum holding and propelling forces. An added flow feature is depicted in FIG. 5 wherein, due to concavity of the web path defined by the obtusely angular orientation of the nozzle and the bottom wall element, the centrifugal forces are directed toward the web transport surface causing reduced entrainment and compression of flow. Therefore, the entraining jet becomes thinner than in the case of a convexly mounted nozzle of the type illustrated in FIG. 6 and the tail will lie closer to the surface and the apparatus 10 will operate with very low side plates.

The degree of concavity is determined by the angle α (FIG. 5) measured between the foil centerline and the axis of the associated bottom wall element. Experience has shown that for maximum holding force the angle α should be slightly larger than the entering web angle. This ensures that during the initial contact phase, the web tail experiences maximum suction and acceleration. Unfortunately, this may not be possible in all cases since some operating environments would require an impractically steep mounting angle α. It has been found that angle α settings up to 20° offer a good operating compromise. A larger α values, tail impingement against the web support surface of the bottom wall element may cause an excessive wave motion in the web which adversely affects the aim of the threading device. Web impingement also generates high noise level; therefore, devices with large angle α values may not be acceptable for some applications.

Figure 11:
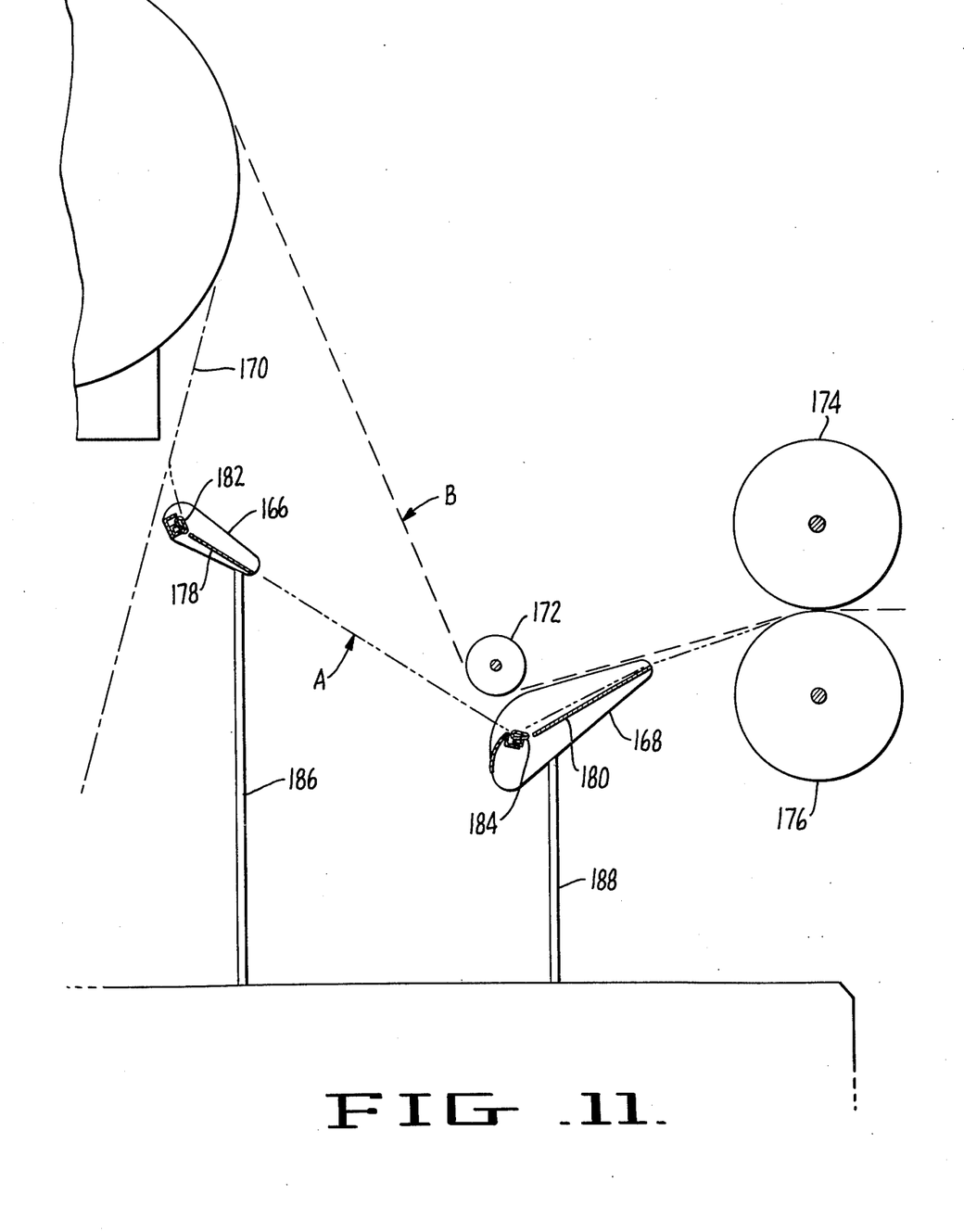
FIG. 11 is a schematic side view of an alternative form of apparatus constructed in accordance with the present invention.

FIG. 11 illustrates still another form of apparatus constructed in accordance with the teachings of the present invention. In this arrangement at least two separate apparatus segments 166 and 168 are employed. The first or upstream segment 166 is positioned adjacent to a rotatable dryer can used to dry a web 170 which normally traverses a path B under a spreader roll 172 to a nip formed between rolls 174 and 176. Apparatus segments 166, 168 each are in the form of open-topped channel members comprising bottom wall elements 178, 180, respectively, and side wall elements connected thereto. Coanda nozzles 182, 184 are positioned at the web entry ends of the channel members in operative association with bottom wall elements 178, 180, respectively. Segments 166, 168 are supported by upstanding rods 186 and 188.

Segment 166 is positioned in operative association with the dryer can under the normal path B of the web 170 where it can readily be utilized to pick up the free end or tail of the web in the event of breakage or initial threading when pressurized air is introduced into segment 166 in the manner previously described. It should be noted that nozzle 182 is angled upwardly relative to bottom wall element 178 so that the nozzle foil surface is essentially congruent with the path of the tail as it exits from the dryer can. The first segment bottom wall element is aimed at Coanda nozzle 184 of the second segment and the web end or tail is projected across the open space between the two apparatus segments. With second segment 168 connected to a suitable source of pressurized air the web will be caught by the second Coanda nozzle and conveyed thereby along its associated bottom wall element 180 to the nip formed by rolls 174 and 176 and along path A.

For proper operation of a system of the type illustrated in FIG. 11 several conditions should be satisfied. First, entraining gaseous flow in at least the first or upstream segment must have a velocity exceeding that of the moving web passing through the paper machine or other mechanism with which it is associated. Second, the first segment must be oriented such that it is aimed at the second segment so that the web end or tail is positioned into close enough proximity to the second Coanda nozzle for it to catch and entrain the web end or tail and convey it to its desired objective. Finally, the upstream and downstream segments should be spaced sufficiently far apart that a significant portion of the gaseous flow in the upstream segment will be vented from the system by being dissipated into the ambient atmosphere so that there will be no interference with the proper operation of the second Coanda nozzle. It will be appreciated that excessive flow from the upstream segment at the location of the second Coanda nozzle can cause the web end or tail to deflect and miss the vicinity of the second Coanda nozzle altogether. Accuracy is extremely important because of the high speeds at which paper webs and the like are being conveyed. Preferably, the flow resulting from the second Coanda nozzle should be at a higher velocity than that of the gaseous flow generated by the first nozzle.

What is claimed is:

1. Apparatus for directing the tail of a moving web of flexible material to a predetermined location comprising:
   a first wall element having a first web transfer surface open to the atmosphere and having a web entry end and a web exit end;
   means disposed at said web entry end defining a first restricted opening communicating with said first web transfer surface including a first foil element having a first generally curved fluid flow attachment surface leading from said first restricted opening toward said web exit end whereby gas under pressure passing through said first restricted opening will attach itself to said first fluid flow attachment surface due to the Coanda effect and entrain ambient air and said web tail to direct same along said first web transfer surface; and
   separator means disposed at said first wall element web exit end for separating said web from a substantial portion of the combined flow of said entraining gas and said entrained ambient air, said separator means comprising a diverting wall element connected to said first wall element at the web exit end thereof and having a generally curved fluid flow diverting surface for changing the direction of movement of a substantial portion of the combined flow of said entraining gas and said entrained ambient air due to the Coanda effect, and web restraining means for preventing said web from moving along said fluid flow diverting surface with said substantial portion of combined flow while at the same time permitting said web to proceed toward said predetermined location.

2. The apparatus of claim 1 wherein said web restraining means comprises a barrier fixedly positioned at said first wall element exit end adapted to be engaged by said web tail, said barrier having openings therein through which said substantial portion of said combined flow of entraining gas and entrained embient air may pass freely.

3. The apparatus of claim 2 wherein said barrier comprises a plurality of end-mounted, spaed bar members.

4. The apparatus of claim 1 further comprising a second wall element having a second web transfer surface and having a web entry end and a web exit end, the web entry end of said second wall element being positioned downstream from the web exit end of said first wall element and spaced therefrom and adapted to receive the web tail from said first wall element web exit end, means disposed at the web entry end of said second wall element defining a second restricted opening communicating with said second web transfer surface including a second foil element having a second generally curved fluid flow attachment surface leading from said second restricted opening toward said second wall element web exit end whereby gas under pressure passing through said second restricted opening will attach itself to said second fluid flow attachment surface due to the Coanda effect and entrain ambient air and said web tail to direct same along said second web transfer surface to a predetermined location.

5. The apparatus of claim 1 wherein said first wall element web entry end is positioned adjacent to a mechanical member having a moveable web carrying surface, said first wall element having mounted thereon at said web entry end nozzle means having the outlet end thereof directed at said moveable web carrying surface so that pressurized fluid ejected from the nozzle outlet will impinge against said moveable web carrying surface to assist in dislodging therefrom said web tail and placing same into close proximity to said first generally curved fluid flow attachment surface whereby said web tail may be entrained by said entraining gas passing through said first restricted opening.

6. The apparatus of claim 5 wherein said first wall element is pivotally mounted for selective manual movement relative to said mechanical member.

7. The apparatus of claim 1 wherein said first restricted opening is in the form of at least one slit disposed at substantially right angles to the major axis of the first web transfer surface.

8. The apparatus of claim 1 wherein the first foil element is angularly positioned relative to said first web transfer surface so that the entraining gas impinges against said first web transfer surface and said entraining gas traverses a concave path of movement.

9. The apparatus of claim 8 wherein the angle between the flow direction axis of said first foil element and the axis of said first web transfer surface extending from the entry end to the exit end does not exceed 20°.

10. Apparatus for directing the tail of a moving web of flexible material to a predetermined location along an alternate web path spaced from the normal running path of said web and leading to said predetermined location comprising:

a first apparatus segment disposed out of the normal running path of said web and having an open-ended, open-topped channel member including a first wall element defining a first web transfer surface along said alternate web path and open to the atmosphere with a web entry end and a web exit end and a first Coanda nozzle disposed at the web entry end to direct a gaseous flow in said channel member along said first web transfer surface from said web entry end to said web exit end; and a second apparatus segment having an open-ended, open-topped channel member including a second wall element defining a second web transfer surface along said alternate web path and open to the atmosphere with a web entry end and a web exit end and a second Coanda nozzle disposed at the second web transfer surface entry end to direct a gaseous flow in said second segment channel member from the web entry to the web exit end thereof, said first segment being directed toward said second segment and spaced therefrom a substantial distance whereby the web tail is projected across an open space between segments along said alternate web path toward said second Coanda nozzle by said first segment and is engaged and entrained by the gaseous flow in the second segment in the vicinity of said second Coanda nozzle and propelled further along said alternate web path, and whereby a substantial portion of the gaseous flow from the first segment does not reach said second segment.

11. The apparatus of claim 10 wherein said first Coanda nozzle includes a first foil element angularly positioned relative to said first web transfer surface so that the entraining gas impinges against said first web transfer surface and said entraining gas traverses a concave path of movement essentially in congruence with said alternate web path.

12. A method of directing the tail of a moving web of flexible material to a predetermined location comprising the steps of:

positioning a flow path for gas adjacent to said web tail;

flowing a pressurized gas through at least one restricted opening communicating with said gas flow path in a direction differing from the direction of said gas flow path;

changing the direction of the pressurized gas after it flows through said restricted opening through utilization of the Coanda effect so that it flows along the first gas flow path;

entraining ambient air with said pressurized gas so that a combined gaseous flow of pressurized gas and entrained ambient air flows along the gas flow path;

placing the web tail into engagement with the gaseous flow whereby the tail is entrained and propelled thereby along the gas flow path; and diverting the direction of a substantial portion of the gaseous flow away from said web tail through utilization of the Coanda effect while physically restraining said web tail in such a manner that the web tail is prevented from moving with said substantial portion of said gaseous flow but is not prevented from moving toward said predetermined location.

13. The method of claim 12 wherein the web tail is brought into engagement with a second gaseous flow flowing along a second gas flow path after said web tail has been prevented from moving with said diverted substantial portion of gaseous flow.

14. The method of claim 13 wherein said second gaseous flow comprises an entraining gas and ambient air entrained thereby.

15. The method of claim 14 wherein said entraining gas of the second gaseous flow has passed through at least one restricted opening and attached to a generally curved fluid flow attachment surface to change the direction of same through utilization of the Coanda effect before flowing thereof along said second gas flow path.

16. The method of claim 12 wherein said gas flow path is defined by a substantially planar surface and wherein said pressurized entraining gas is directed onto said surface at an angle so that the pressurized entraining gas traverses a concave path of movement.

17. The method of claim 16 wherein said angle does not exceed 20°.

18. The method of directing the tail of a moving web of flexible material to a predetermined location along an alternate web path spaced from the normal running path of said web and leading to said predetermined location comprising the steps of:

positioning a first flow path for gas adjacent to said web tail and along said alternate path;

flowing a pressurized gas through at least one restricted opening of a Coanda nozzle communicating with said first flow path so tat a gaseous flow is directed along said first flow path;

positioning a second flow path for gas along said alternate path between said first flow path for gas and said predetermined location;

flowing a pressurized gas through at least one restricted opening of a second Coanda nozzle communicating with said second flow path so that a gaseous flow is directed along said second flow path;

directing said fist flow path toward said second flow path while maintaining a predetermined distance therebetween of sufficient magnitude such that a substantial portion of the gaseous flow from the first flow path is dissipated before it reaches the second flow path; and bringing the web tail and the gaseous flow along said first flow path into operative engagement so that the tail is projected across said predetermined distance toward said second Coanda nozzle and is entrained by the gaseous flow along the second flow path in the vicinity of said second Coanda nozzle and advanced thereby along the alternate web path.

19. In combination:

a mechanical member having a moveable web carrying surface, said member normally adapted to deliver a moving web of flexible material to a predetermined location along a normal path of web movement extending from a normal web exit location on said mechanical member to said predetermined location; and apparatus for directing the tail of said moving web of flexible material along an alternate web path and including a wall element having a web transfer surface disposed along said alternate web path and open to the atmosphere, said web transfer surface having a web entry end and a web exit end, and a Coanda nozzle disposed at said web transfer surface web entry end, said Coanda nozzle including a foil element having a generally curved fluid flow attachment surface leading from a restricted opening toward said web exit end whereby gas under pressure passing through said restricted opening will attach itself to the fluid flow attachment surface due to the Coanda effect and entrain ambient air and said web tail to direct same along the web transfer surface along the alternate web path, said foil element being angularly positioned relative to the web transfer surface so that the entraining gas impinges against the web transfer surface and traverses a concave path of movement essentially in congruence with the alternate web path.

* * * * *